UNITED STATES PATENT OFFICE.

JOHN S. RANDOLPH, OF PEORIA, ILLINOIS, ASSIGNOR OF ONE-HALF HIS RIGHT TO LOUIS F. MENAGE, OF MINNEAPOLIS, MINNESOTA.

IMPROVEMENT IN COMPOUNDS FOR ARTIFICIAL STONE.

Specification forming part of Letters Patent No. 211,108, dated January 7, 1879; application filed September 30, 1878.

*To all whom it may concern:*

Be it known that I, JOHN SUMMERFIELD RANDOLPH, of Peoria, in the county of Peoria and State of Illinois, have invented an Improved Compound for Artificial Stone; and I hereby declare the following to be a full, clear, and correct description of the same.

My invention relates to the manufacture of artificial stone; and consists of a composition of certain ingredients chemically combined in such manner as to produce a hard, crystallized material which is impervious to moisture, and will withstand the action of frost in any climate, and is unaffected by fire, or fire and water combined, or when brought in contact, as in the case of fires, thereby particularly adapting it to use as a building material, or for any purpose for which stone is used.

To enable others to understand and use my invention, I will describe the manner in which I have carried it out.

I place thirty gallons of clean water in a suitable vessel, and add thereto two and one-half pounds of sulphate of potash, two pounds of carbonate of barium, one and one-half pound of sulphate of iron and ammonium, and four pounds of carbonate of soda, the latter dissolved in two gallons of alcohol, and then added to the mixture.

I mean by the term "sulphate of iron and ammonium" the chemical substance formed by the union of the solution of tersulphate of iron with the sulphate of ammonium. It is prepared by heating the solution of tersulphate of iron with the sulphate of ammonium until the latter salt is dissolved, and then allowing the solution to cool. The two salts unite to form the sulphate of iron and ammonium.

These ingredients are well mixed by stirring. I then mix, while dry, five parts of clean sharp sand, not too fine, or sand and gravel, and one part of the best English Portland cement. No other will do. I then dilute five quarts of the compound above described with fifty gallons of clean water, and thoroughly mix them together. I then use a sufficient quantity of said last-mentioned diluted mixture to dampen the mixed sand and cement, so that it can be tamped in the usual manner.

I am thus able to produce an artificial stone of great hardness and durability.

The stone, after being manufactured as above stated, should not be permitted to become dry on the surface, but should be kept dampened with water for about one week, in which time it will become petrified and fit for use.

Having, as above, described my invention, what I claim, and desire to have secured to me by Letters Patent, is—

1. The herein-described chemical compound, consisting of water, sulphate of potash, carbonate of barium, sulphate of iron and ammonium, carbonate of soda, and alcohol, substantially in the proportions above named, and diluted as above set forth, for the purpose of producing the crystallization of the artificial stone, as specified.

2. An artificial stone composed of sand and cement, in the proportion as above stated, moistened with a chemical mixture, diluted as above described, before tamping, substantially as and for the purposes above set forth.

JOHN SUMMERFIELD RANDOLPH.

Witnesses:
  SAMUEL SEABURY,
  JAMES M. RICE.